United States Patent [19]

Kempka

[11] 4,164,094

[45] Aug. 14, 1979

[54] ADJUSTABLE PLANT SUPPORT

[76] Inventor: Dorothy E. Kempka, 28305 SE. 61st St., Issaquah, Wash. 98027

[21] Appl. No.: 813,482

[22] Filed: Jul. 7, 1977

[51] Int. Cl.² ............................................. A01G 17/06
[52] U.S. Cl. .......................................... 47/47; 248/545
[58] Field of Search ....................................... 47/44–47, 47/42–43; 248/531, 161

[56] References Cited
U.S. PATENT DOCUMENTS 2,501,255   3/1950   Bell ........................................... 47/43

*Primary Examiner*—Robert E. Bagwill
*Attorney, Agent, or Firm*—Dowrey & Cross

[57] ABSTRACT

A plant support made in two sections of wooden, plastic or metal material, so that the sections can be added to one another to increase the length of the support as the plant grows; AIR VENTILATION SLOTS for prevention of SWELLING, OXIDATION and CORROSION of the said MATERIALS in order that the hereby above Adjustable Plant Support is in fact a TRULY Adjustable Plant Support as claimed by me above and hereafter.

2 Claims, 3 Drawing Figures

ADJUSTABLE PLANT SUPPORT

My invention relates to new and useful improvements in plant support. It is normal to use wooden, plastic and metal stakes to train and support plants during the growing period. However, as the plants normally being supported may be grown to a height of several feet, it is conventional to raise the adjustable plant supporter so that the plants need not be disturbed when they need supporting. I have overcome the disadvantage by providing wooden, metal or plastic stakes which can be raised in height as desired, and to keep pace with the growth of the plants being supported, without disturbing the roots. The principal object in essence of my invention is therefore to provide plant stakes which can be increased in length as required.

Another object of my invention is a plant support of the character herewithin described, which is provided with AIR VENTILATION CHANNELS, which the said channels will prevent the herewithin desscribed plant support materials from swelling, corrosion and oxidation otherwise swelling, corrosion and oxidation of the within plant support will render the movable parts of the herewithin described plant support useless for all purposes of adjustment, and thereby such a plant support will no longer be an adjustable plant support.

The plant support will commonly draw moisture from the plant soil from frequent watering of the plants and other weather elements which the same will cause swelling, corrosion and oxidation.

With my herein described VENTILATION CHANNELS the plant supporter will be at all times ADJUSTABLE as claimed.

With these and other objects in view, the invention consists in certain novel features of construction, combination and arrangement of parts to be hereinafter more fully described and claimed.

For a complete understanding of my invention, reference is to be had tothe following description and accompanying drawing, in which FIG. 1 is a perspective view of the adjustable part of a supporter.

Figure 1:
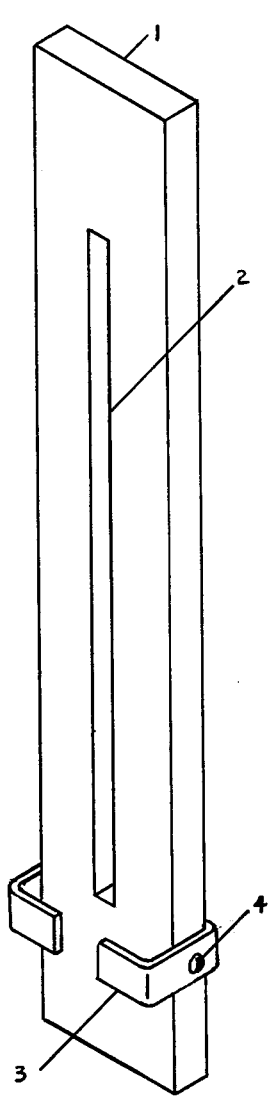
Figure 2:
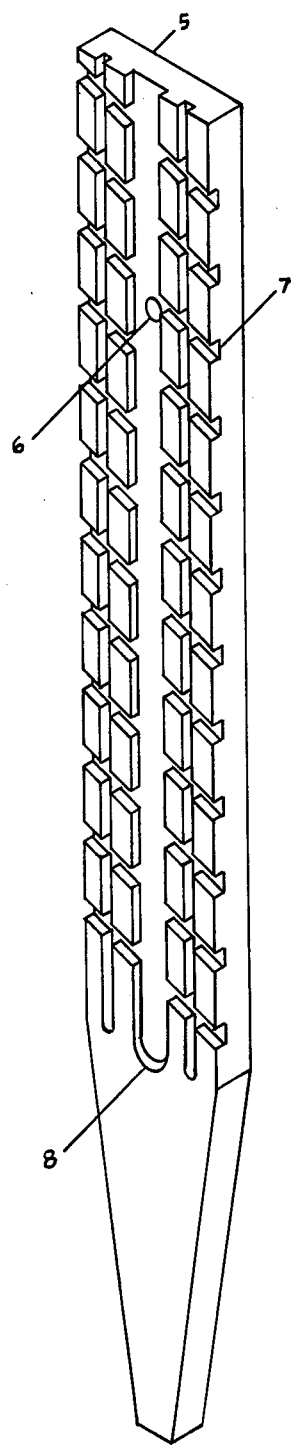
FIG. 2 is a perspective view of the lower part of a supporter for an adjustable support.
Figure 3:
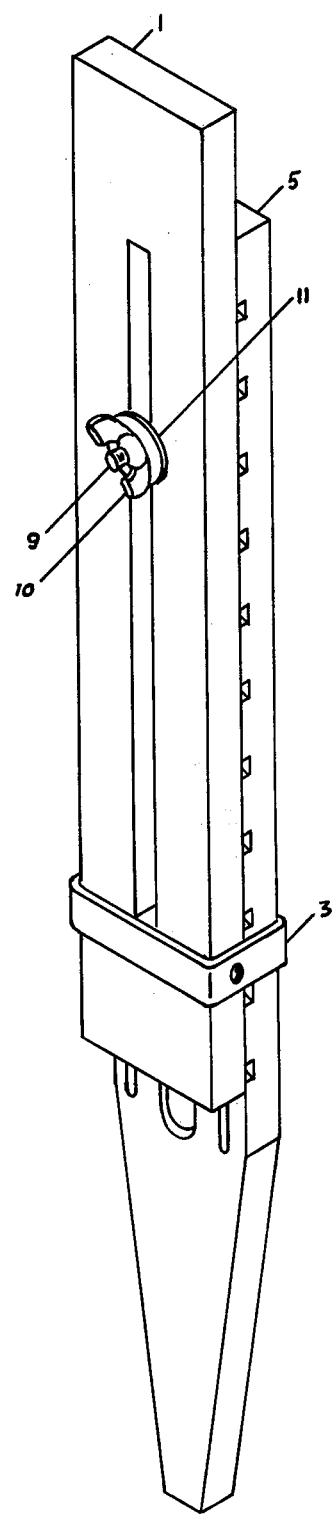
FIG. 3 is a perspective view of a complete adjustable supporter.

Referring to the drawings FIG. 1, 1, shows the sliding portion 5. of the supporter which can be made from wood, plastic or metal with the longitudinal slot 2, through which slot passes bolt 9, (FIG. 3) a metal clamp 3, is attached to the sides of the bottom part of the sliding portion with two round head screws 4, one screw at each side. FIG. 2, 5, shows the lower stationary portion of the supporter which is formed with a pointed lower end, the said portion can be made from wood, plastic or metal. Hole 6, is for receiving a round head bolt 9, (FIG. 3). 7, are horizontal air ventilation channels which are cut on an angle to permit air ventilation and also moisture drainage. 8, are vertical air ventilation channels with two narrower accompanying vertical air ventilation channels, one along the left side and one along the right side of channel number (8) the narrower channels are not numbered but can be plainly seen in (FIG. 2) of the drawing. FIG. 3, shows a complete adjustable supporter consisting of the stationary pointed portion 5. (FIG. 2) and the sliding portion 1, (FIG. 1) FIGS. 1 and 2 are connected by means of one bolt passed through the bore 6, and through the longitudinal slot 2, and by means of one metal clamp 3, on the end of bolt 9, is installed wing nut 10, together with a base washer 11. By loosening wing nut 10, an upward or downward movement of the sliding portion 1, along the slot 2, causes the supporter to be adjustable. By tightening the wing nut 10, the plant supporter once set at desired height will remain rixed in the said desired position.

It is believed that the simplicity and advantages of this invention will be perfectly apparent to those skilled in the art to which such a device relates, and while I have herein set forth a satisfactory embodiment of the invention, it is to be understood that such changes therefrom as fairly fall within the scope of my claim may be resorted to when desired.

Having described my invention, what I claim is:

1. An adjustable plant support, comprising
first and second members adapted for abutment along respective inner faces, the first member including means for securely positioning the first member with respect to the ground and at least one of the members including channel means forming a plurality of transverse channels intersected by at least one longitudinal channel in such member's inner face for preventing moisture buildup and retention between the members; and
adjustment means for securing the members in a plurality of relative, abutting positions such that the members are adjustable in position with respect to each other.

2. The plant support of claim 1, wherein the channel means forms a plurality of longitudinal channels intersecting the transverse channels.

* * * * *